United States Patent [19]    [11]    4,189,115
Suzuki    [45]    Feb. 19, 1980

[54] AUTO-LOADING MAGNETIC TAPE
[75] Inventor: Yoshihisa Suzuki, Yokohama, Japan
[73] Assignee: Hitachi, Ltd., Japan
[21] Appl. No.: 817,680
[22] Filed: Jul. 21, 1977
[30] Foreign Application Priority Data
Jul. 21, 1976 [JP] Japan ............................. 51/86023
[51] Int. Cl.² ............................................. G11B 15/66
[52] U.S. Cl. .................................. 242/195; 242/71.8;
242/210
[58] Field of Search ............... 242/195, 182, 210, 209,
242/71.8; 360/134, 96, 93, 95

[56] References Cited
U.S. PATENT DOCUMENTS
3,807,652  4/1974  Kruhn et al. ...................... 242/195
3,910,526  10/1975  Mosciatti .......................... 242/182

FOREIGN PATENT DOCUMENTS
1547015  10/1969  Fed. Rep. of Germany .......... 242/195

Primary Examiner—George F. Mautz
Attorney, Agent, or Firm—Craig and Antonelli

[57]    ABSTRACT

The end of an auto-loading magnetic tape for a computer magnetic tape device is formed in a loop with the magnetized side thereof bent to face outwardly. The length of the bent portion is equivalent to between half and twice the square root value of the product of the radius of a file reel and the spare radial length of the reel radius. The loop is so constructed that the extreme end of the magnetic tape is bonded to the base side of the magnetic tape. The end of the magnetic tape thus offers higher air resistance than the other parts of the tape to the air flow in the cartridge containing the magnetic tape, thereby enhancing the chance of success in a tape auto-loading operation.

6 Claims, 13 Drawing Figures

AUTO-LOADING MAGNETIC TAPE

LIST OF PRIOR ART REFERENCES (37 CFR 1.56 (a))

The following references are cited to show the state of the art:

Japanese Patent Publication No. 10,020/68, filed before the Japanese Patent Office on May 25, 1967 claiming convention priority based on U.S. Pat. application Ser. No. 565,549, now U.S. Pat. No. 3,398,913, which relates to a vacuum controlled jet transport apparatus for a magnetic tape.

Japanese Patent Publication No. 15,229/68, filed before the Japanese Patent Office on Aug. 18, 1967 claiming convention priority based on U.S. Pat. application No. 577,883, now U.S. Pat. No. 3,371,882, which relates to a toggle latching reel cover with a sliding door.

BACKGROUND OF THE INVENTION

1. Field of the Invention

This invention relates to the auto-loading of a magnetic tape device for a computer, or more in particular to a magnetic tape contained in a cartridge with a greater chance of success in an auto-loading operation.

2. Description of the Prior Art

An auto-loading mechanism for the computer magnetic tape device contained in a cartridge operates such that the end of the magnetic tape is led by air flow in the cartridge. The end of the magnetic tape is preferably subjected to larger air resistance. The cartridge defines the air flow between the outer frame of the reel and a cover with a V-shaped section surrounding the outer periphery of the reel. The conventional auto-loading magnetic tape for use in computers, not particularly different from ordinary magnetic tapes, has an end with two corners thereof rounded like an auto-loading movie film.

Such a construction is intended to prevent the end of the magnetic tape with an otherwise sharp end from being blocked by the components making up the running path within the magnetic tape device, in order to assure successful loading.

In the computer magnetic tape devices, however, it has been found that the above-mentioned construction reduces the chance of success in loading. A loading operation becomes successful when the magnetic tape delivered from a file reel begin to be wound on a machine reel. The chance of success which is expressed by the ratio of the number of times of smooth loading operations to the total number of times of attempts to load, should be as high as 100%. It is known that failures in auto-loading are attributable to the following operation factors:

(1) The magnetic tape, after being unloaded, may be wound on the reel loosely, and the loosened condition of the magnetic tape within the reel becomes a cause of a loading failure on the next occasion.

(2) The end of the magnetic tape may be broken when it is attracted to the machine reel, probably resulting in unsuccessful loading in the next attempt to load.

(3) The unstable opening of closing functions of the cartridge may cause the end of the magnetic tape to be caught in the cartridge and damage it while unloading it.

As a result of further study of these operating defects, it has been found that they are attributable to the unstableness with which the end of the magnetic tape is moved in corrugated motion by the air flow within the cartridge toward the outlet thereof.

SUMMARY OF THE INVENTION

Accordingly, it is an object of the present invention to provide a magnetic tape wound on a reel with the construction improving the chance of success in an auto-loading operation.

Another object of the present invention is to prevent breakage of the magnetic tape in the auto-loading operation.

In order to achieve the above-mentioned objects, the device according to the present invention is so constructed that a specific portion of the end of an auto-loading magnetic tape offers larger air resistance than the other parts thereof.

BRIEF DESCRIPTION OF THE DRAWINGS

FIGS. 3a and 3b show a first embodiment of the present invention, in which FIG. 3a is a side view of the end of magnetic tape, and FIG. 3b is a plan view of the end of the magnetic tape.

FIGS. 4a and 4b show a second embodiment of the present invention in which FIG. 4a is a side view of the end of the magnetic tape, and FIG. 4b is a plan view of the end of the magnetic tape.

FIG. 9b is an enlarged partial sectional view along the line X—X' in FIG. 9a.

DESCRIPTION OF THE PREFERRED EMBODIMENTS

Figure 1:
FIG. 1 is a plan view showing the shape of the end of a conventional magnetic tape.
Figure 2A:
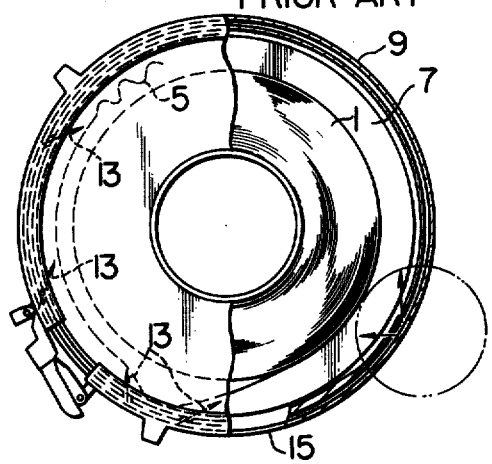
FIG. 2a is a diagram for explaining the winding conditions of the magnetic tape within the cartridge.
Figure 2B:
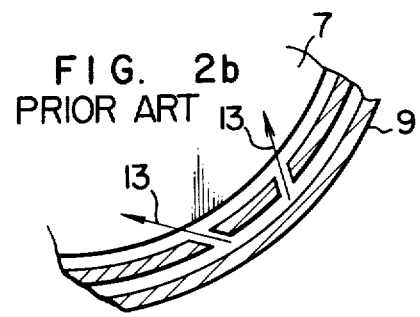
FIG. 2b is a diagram showing in detail the section of the air flow outlet.

In the conventional magnetic tape, much attention was not paid to more successful auto-loading operation, but it is common practice to provide rounded corners 5 at the end of the magnetic tape as shown in FIG. 1. To facilitate the understanding of how the auto-loading operation fails in the cartridge containing the tape, the initial stages of auto-loading operations of the magnetic tape by use of an air flow within the cartridge will be explained below with reference to FIG. 2. In this drawing, the cartridge 9 is fitted over the outer periphery of a reel 7. The cartridge 9 has several air blow holes for blowing out air in the directions shown by arrows 13. Reference numeral 15 shows an outlet from where the magnetic tape 1 is taken out of the cartridge 9. When the magnetic tape 1 is fed by air flow within the cartridge 9 of this construction, the end 5 of the magnetic tape 1 proceeds toward the outlet 15 while moving in a corrugated way by the dashed lines in FIG. 2a. This corrugated motion causes the failure in the auto-loading operation.

In a first embodiment of the present invention conceived to overcome this disadvantage of the conventional device, a certain length of the part of the end of the magnetic tape is bent with the magnetized side thereof outside, so that the end portion of the tape is formed in a loop by being bonded on the base surface of the tape. Thus the end of the magnetic tape offers higher air resistance than the other parts thereof to the air flow in the cartridge containing the magnetic tape.

Figure 3A:
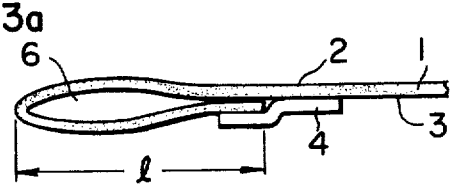
Figure 3B:
Figure 4A:
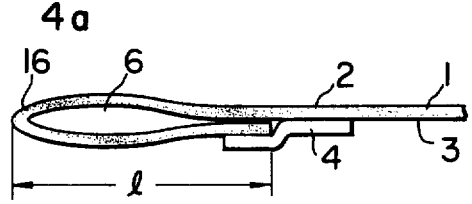
Figure 5:
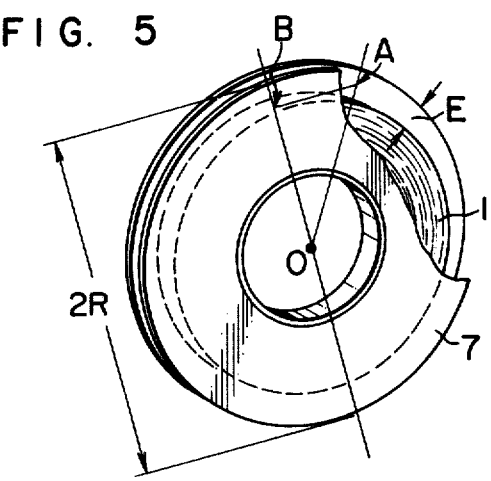
FIG. 5 is a perspective view showing the condition of magnetic tape wound on the reel.
Figure 8:
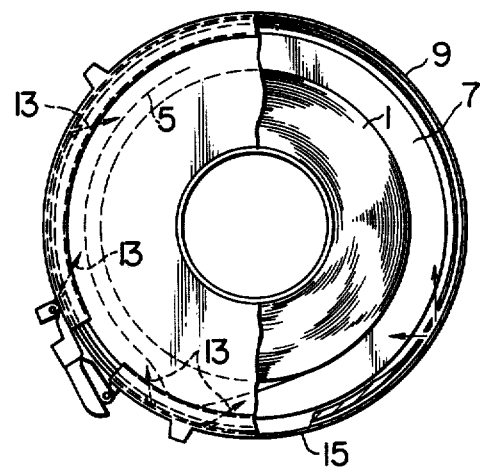
FIG. 8 is a diagram for explaining the winding condition of magnetic tape according to the present invention.

In FIG. 3, the magnetic tape 1 comprises a magnetized layer 2 taking charge of magnetic recording and a high polymer film base 3 for supporting the magnetized layer 2. The magnetized layer 2 is coated on the high polymer film base 3 and comprises fine powder of strong magnetism spread in an organic polymer binder. This magnetic tape 1 is formed into a loop 6 by being bent with the magnetized layer 2 on the outside of the tape 1 as shown in FIG. 3a. By forming the loop with the magnetized layer 2 low in electric resistance bent outside, occurrence of static electricity is prevented. In this way, the chance of success in auto-loading is improved. Further, the bent end of the magnetic tape is fixed on the base surface of the magnetic tape 1. For this purpose, any type of splicing tape used in the prior art may be used as the bonding tape 4. The fixing means is not limited to the bonding tape 4, but the end of the magnetic tape 1 may be directly secured to the base surface. In spite of the fact that the larger the loop 6, the larger resistance is offered by it than by the other parts to the air flow, the rigidity of the loop of the bent tape is higher than the remaining parts. The magnetic tape 1 leaving the cartridge 9 by way of the outlet 15 is subjected to a weaker air flow than in the cartridge on the one hand and is required to change its direction of movement on the other hand. The high rigidity of the loop undesirably causes straight movement of the tape and prevents it from entering a predetermined path within the magnetic tape device. For this reason, as is shown in FIGS. 5 and 8, the end of the magnetic tape 1 should preferably be bent to such a length that the magnetic tape 1 moving straight toward the outlet 15 of the cartridge 9 reaches a middle position A of the spare radial length E of reel radius R (that is, the spare or unused radial length of the reel which is equal to the difference between the reel radius R and the radius of the space occupied by the tape fully wound upon the reel) along a tangent on the outer periphery of the magnetic tape 1. This requirement leads to the length (l) of the bent portion as shown in FIGS. 3a and 4a and as expressed by equation (1) below. The equation (1) will be described with reference to FIG. 5. In the drawing under consideration, character R shows the reel radius, character E the spare radial length of reel radius R, character O the reel central point, character A the middle point of the spare radial length E, character B a given point on the outer periphery of the magnetic tape 1, and line BA a tangent on the outer periphery of the magnetic tape 1 at point B that forms the bent portion (l).

The bent portion (l) is equivalent to the length of the side BA of a right-angled triangle OBA. Thus equation (1) is expressed as Length of bent portion (l) =       (1)

-continued
$$((R - \frac{E}{2})^2 - (R - E)^2)^{\frac{1}{2}} \approx ((R) \times (E))^{\frac{1}{2}}$$

The length (l) of the bent portion, if less than half the value obtained from equation (1), has no sufficient effect. If it is larger than twice the value, on the other hand, the inertia of the end is so large as to result in a failure in auto-loading. The length (l) of the bent portion of the end of the magnetic tape should therefore preferably be longer than half of the value obtained from equation (1) and shorter than twice the same. Figures obtained from a test conducted on the air resistance of the end of the tape at the air velocity of 2.5 m/sec are shown in the table below. The specimen used for the test had the reel radius R of 133 mm and the spare radial length E of 10 mm. The air resistance was measured by means of a spring balancer with a thread attached to the magnetic tape.

| Shape and length (l) of Bent Portion of Tape | Air Resistance (gr.) | Chance of Success (%) |
| --- | --- | --- |
| Bent end 2 l = 10 mm | 0.2 | 98 |
| Bnet end 2 l = 20 mm | 0.4 | 100 |
| Bent end 2 l = 30 mm | 0.6 | 100 |
| Bent end 2 l = 40 mm | 0.8 | 100 |
| Bent end 2 l = 50 mm | 1.0 | 100 |
| Bent end 2 l = 60 mm | 1.2 | 100 |
| Bent end 2 l = 70 mm | 1.4 | 100 |
| Bent end 2 l = 80 mm | 1.6 | 99 |
| Bent end 2 l = 100mm | 2.0 | 98 |

The magnetic tape is required to be guided against its weight. The magnetic tape weighs approximately 0.2 gr. for each 10 mm. The results of the test show that up to 2 l=70 mm, i.e., as far as the length of the bent portion is twice the optimum length, the chance of success in auto-loading may be kept at 100% with the increase in the air resistance of the bent end. Beyond this limit, however, the auto-loading is adversely affected and fails. The end of the magnetic tape is bent into a loop with the magnetized side thereof outside in order that when it reaches the take-up reel and is attracted by vacuum, the end of the tape may not be damaged. As already explained, this eliminates occurrence of static electricity, thus facilitating the tape winding on the machine reel.

Another advantage of the present invention is that since the tape is fed by air flow within the cartridge while being attracted from the reel shaft, and the end of the magnetic tape is thus "pulled" for the winding process, no loosened condition occurs at the time of unloading on the one hand and the end of the magnetic tape is not caught in the cartridge on the other hand.

Figure 4B:
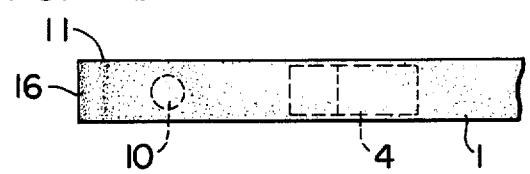

A second embodiment of the present invention shown in FIGS. 4a-b is such that a hole 10 is formed in the loop section 6 of the end of the magnetic tape 1 according to the first embodiment. The hole 10 may be formed at any position of the loop 6 except for the folded section 16 where, if formed with such a hole, the present invention loses its features. The hole 10 may be of any size as far as the end of the magnetic tape 1 is not broken, but it has a diameter preferably one fourth to three fourths of the width of the magnetic tape. Instead of one hole, a plurality of holes of the same size as the abovementioned single hole may be formed with equal effect. Although the hole 10 is circular in shape in the shown embodiment, it may take the form of a triangle, a polygon or any other desired shape with substantially the same area as the circular hole. This hole increases the air resistance in the cartridge by several tens of percents, thereby facilitating the introduction of the end of the tape by air flow into the outlet 15.

Figure 6:
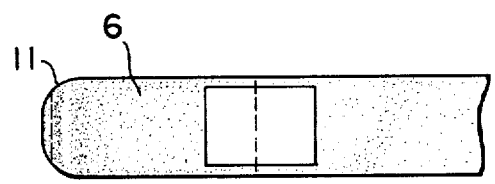
FIG. 6 is a diagram showing a third embodiment of the present invention.

According to a third embodiment of the invention shown in FIG. 6, the corners 11 of the loop 6 of the end of the magnetic tape 1 of FIG. 4(b) are rounded. In this way, when the magnetic tape proceeds along the air flow in the cartridge of FIG. 8, it is prevented from "biting" the inner wall of the reel 7 or the cartridge 9. By rounding the corners of the loop 6, the chance of success in auto-loading is further improved.

Figure 7:
FIG. 7 is a diagram showing a fourth embodiment of the present invention.
Figure 9A:
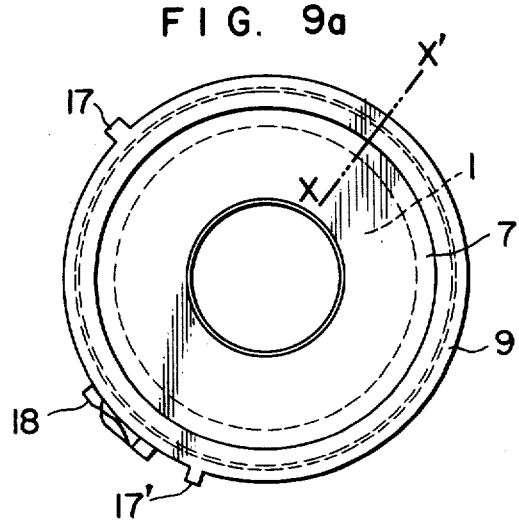
FIG. 9a is a perspective view showing the reel of FIG. 5 as contained in the cartridge.
Figure 9B:
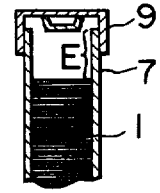

A fourth embodiment of the invention is shown in FIG. 7. According to the embodiment under consideration, the end of the magnetic tape 1 is provided with a corrugated part 12 within the range of the length (l) without being bent. The pitch of the corrugated part 12 is preferably 10% to 50% of the width of the magnetic tape 1. When the magnetic tape has the width of a half inch, for instance, the proper pitch of the corrugated part 12 is 2.5 mm to 12.7 mm. If the length (l) of 20 mm is involved, eight wrinkles are formed for the pitch of 2.5 mm. The relation between the pitch of the corrugated part and the length (l) is selectively set in such a manner that the wrinkles cover 10% to 50% of the width of the magnetic tape 1. The end of the magnetic tape with the corrugated part 12 increases the air resistance by disturbing the air flow along the surface of the magnetic tape 1 within the cartridge 9, thus feeding the magnetic tape with the same effect as the other embodiments. FIG. 8 is a diagram corresponding to FIG. 2 of the prior art and shows the initial condition of autoloading of the magnetic tape. The end of the magnetic tape 1 according to the present invention is loaded without being vibrated along the air flow within the cartridge. The diagram of FIG. 9a shows the cartridge 9 containing the auto-loading magnetic tape 1 with the end thereof formed according to the present invention. The protrusions 17 and 17' are formed on the cartridge 9 for securing the cartridge 9 in position in relation to the magnetic tape device. Numeral 18 shows an arm for opening the window of the cartridge 9. FIG. 9b is an enlarged partial sectional view taken along the line X—X' in FIG. 9a for clearly illustrating the relation between the cartridge 9, reel 7, and magnetic tape 1.

It will be understood from the foregoing description that according to the present invention, the failure of auto-loading is substantially zero compared with several percents for the conventional forms of magnetic tape. Further, the looped end of the magnetic tape and the resulting increased apparent thickness thereof prevents the end from being caught between the cartridge and the reel when being unloaded. Furthermore, in view of the fact that the magnetic tape is fed by air flow in the cartridge and attracted by vacuum from the reel shaft, the end thereof is "pulled" while being wound, thus eliminating any loosened condition both at the time of unloading and rewinding it.

I claim:

1. An auto-loading magnetic tape assembly for use with an auto-loading apparatus utilizing an air flow, comprising a reel and a magnetic tape wound thereon, wherein an end portion of the magnetic tape wound on the reel has a larger air resistance than other parts of said magnetic tape, said end portion being of a length longer than half the square root of the product of a reel radius R and the difference between the radius R and a radius of the space occupied by the tape when fully wound on said reel and being shorter than twice said square root.

2. An auto-loading magnetic tape according to claim 1, wherein said length of said end portion of said magnetic tape wound on the reel is bent into a loop with a magnetized side of said magnetic tape outside, a free end of said magnetic tape being secured to a base surface of said magnetic tape.

3. An auto-loading magnetic tap according to claim 2, wherein at least a hole having a diameter within a range of one-fourth to three-fourths of the width of said magnetic tape is formed in the bent portion of said magnetic tape.

4. An auto-loading magnetic tape according to claim 2, wherein the corners of the bent portion of said magnetic tape are rounded.

5. An auto-loading magnetic tape according to claim 3, wherein the corners of the bent portion of said magnetic tape are rounded.

6. An auto-loading magnetic tape according to claim 1, wherein said length of said end of said magnetic tape wound on the reel is corrugated.

* * * * *